Dec. 25, 1923.
W. L. DARNELL
1,478,849
BRAKE BAND
Filed April 5, 1922
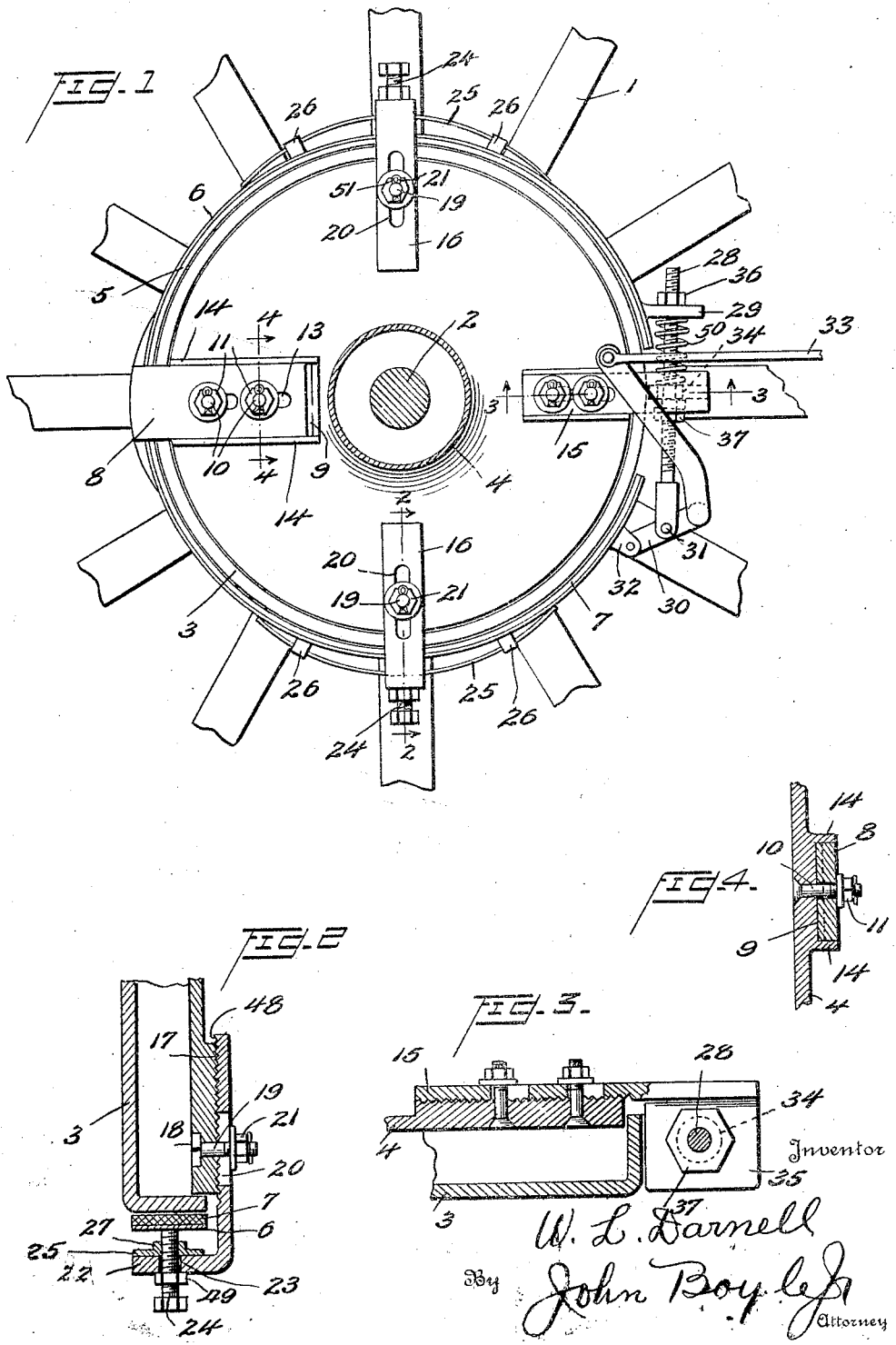

Patented Dec. 25, 1923.

1,478,849

UNITED STATES PATENT OFFICE.

WILLIAM L. DARNELL, OF FRANKLIN, TENNESSEE.

BRAKE BAND.

Application filed April 5, 1922. Serial No. 549,773.

*To all whom it may concern:*

Be it known that WILLIAM L. DARNELL, citizen of the United States, residing at Franklin, in the county of Williamson and State of Tennessee, has invented certain new and useful Improvements in Brake Bands, of which the following is a specification.

My invention relates to brake bands for automobiles and trucks, and one of the objects of the invention is to provide a device of this character which can be readily removed and placed in position without removing the wheel, as for instance in relining the brake.

Another object of the invention is to provide means for securely holding the brake band in position and also for adjustably varying the tension of the same at any point. This adjustment may also be used for allowing varying thicknesses of brake linings.

A further object of the invention is to provide a brake band which can be adapted to any make of car with very slight modifications of structure to prevent dragging of the brake at any point.

With these general objects in view, my invention consists in certain novel and peculiar features of construction and combination of parts as hereinafter described and claimed, and in order that it may be fully understood, reference is to be had to the accompanying drawing in which—
Fig. 1 is an elevation, Fig. 2 is a fragmentary section on the line 2—2 of Fig. 1, Fig. 3 is a section on the line 3—3 of Fig. 1, Fig. 4 is a section on the line 4—4 of Fig. 1.

In the drawings, 1 is the rear wheel of an automobile fixed to the axle 2, the brake drum 3 being fixed to and rotating with the said wheel. Surrounding the axle is the stationary axle housing 4 and on which the brake band 5 is supported. The brake band comprises a strip of metal 6 and secured thereto is the brake lining 7 of suitable material.

Integrally united to the brake band at its rear end by welding or riveting, is the adjusting clamp 8, the said clamp being adjustably secured to the brake housing for holding the brake band in operative position. For effecting relative longitudinal adjustment of the brake band and brake housing, the latter is provided with gripping teeth 9 which cooperate with similar teeth carried by the clamp, in a manner similar to that shown in Fig. 2. Secured to the brake housing are square headed bolts 10 which are counter sunk so as not to be rotated when the nuts 11 are turned thereon, the said bolts passing through slots 13 in the clamp to permit adjustment. For preventing relative rotation of the brake band and housing, the latter is provided with ribs 14 which form a groove in which the said clamp fits.

Rigidly and adjustably secured to the front of the brake housing with a similar adjustment to that shown in Fig. 2 is another and smaller clamp 15, which serves to retain the front end of the brake parts in aligned position.

Rigidly and adjustably secured to the top and bottom of the axle housing are clamps 16, for adjusting the tension of the brake band to avoid dragging. For effecting longitudinal adjustment of each clamp and for secure'y holding it in adjusted position, the brake housing is provided with serrated teeth 17, which engage similar teeth 48 on the clamp. Counter sunk in the brake housing to prevent rotation is the square head 18 of the bolt 19, which passes through the slot 20 in the clamp, a removable nut 21 cooperating with the bolt to secure the clamp in adjusted position.

The purpose of the top and bottom clamps is to provide for adjustment of the brake band. With that end in view, the clamp is provided with a portion 22, through a non threaded aperture 23, in which a bolt 24 passes.

Extending between the portion 22 and the brake band is a leaf spring 25 with its end freely moving between guides 26. Integrally secured to the inner side of the said spring is a nut 27 with which the bolt 24 is in screw threaded engagement.

The front free ends of the brake are connected together by a screw threaded rod 28 which at one end passes loosely through an aperture in the ear 29 on the brake band and at the other end is pivotally connected to a lever 30 at 31. The lever 30 is pivoted to lug 32 secured to the brake band, the said lever being connected to a link 33 which is operated by the customary foot lever.

The rod 28 passes through an aperture 34 in the upper part 35 of the clamp which overlies the brake band. Interposed between the upper part 35 and the ear 29 is a tensioning coil spring 50 which surrounds the said rod. For adjusting the tension of the said rod 28, the nut 36 is provided. Nuts 37 carried by the said rod intermediate its ends may also be used for adjusting the tension as well as acting as a stop. These nuts 37 are used for adjusting the tension of the lower free end of the brake.

The adjusting nuts on the adjusting bolts of all the clamps are retained in position by cotter keys 51.

Operation.

When it is desired to remove the brake band, as for replacing a lining, the nuts are removed from the top, bottom and main rear clamps. On account of the fact that the bolts are not rotatable it is not necessary to try to get a tool in position between the brake and wheel as is customary with many brake constructions; nor is it necessary to take the wheel off. The free ends of the band having been separated by removing the necessary parts, the band is slipped off of the drum and over the axle. The reverse series of operations are followed in replacing the band.

When it is desired to adjust the tension of the top or bottom portions of the brake band, the lock nut 49 is first loosened and the bolt 24 is turned in the desired direction depending on the adjustment desired. The effect of turning the bolt right handed is to force its end against the brake band, thus effecting a definite spaced relation between the spring and band. Thereafter the lock nut is rotated in the desired direction to draw the band spring together away from the drum to any desired extent and thus avoiding dragging of the band. After the parts have been adjusted, slight variations in the tension can be effected by a slight rotation of the bolt 24, after loosening the lock nut a trifle.

From the above description it will be apparent that I have produced a device of the character enumerated as desirable, and while I have illustrated and described the preferred form of the invention, it will be understood that I reserve the right to all changes properly falling within the spirit and scope of the appended claims.

Therefore what I desire to secure by Letters Patent of the United States, is:

1. A vehicle brake, comprising a rotary drum, a band surrounding the same, a clamp integral with the band, an axle housing and means for detachably securing the clamp to the axle housing.

2. A vehicle brake comprising a rotary drum, a band surrounding the same, a clamp integral with the band, an axle housing, means for detachably securing the clamp to the axle housing and means for adjusting the tension of the band to prevent dragging when the brake is off.

3. A vehicle brake comprising a rotary drum, a brake band surrounding the same, an axle housing, clamps secured to the brake band, non-rotatable bolts mounted in the axle housing for holding the clamps in position thereon, the axle housing being free from obstructions, when the said clamps are removed and permitting removal of the brake band by movement away from the wheel.

4. A vehicle brake comprising a rotary drum, a brake band surrounding the same, an axle housing, clamps secured to the axle housing and to the band, means for adjusting the tension of the band to prevent dragging when the brake is off, comprising a non-threaded aperture in one of the clamps through which a bolt passes, a leaf spring carried by the band, a nut integrally secured to the inner side of said spring for engaging the said bolt, a lock-nut engaging the clamp and the said bolt, the inner end of the bolt engaging the brake band.

In testimony whereof I affix my signature.

WILLIAM L. DARNELL.